United States Patent
Matsumoto et al.

(10) Patent No.: US 12,104,938 B2
(45) Date of Patent: Oct. 1, 2024

(54) AIR FLOW RATE METER

(71) Applicant: Hitachi Astemo, Ltd., Hitachinaka (JP)

(72) Inventors: Masahiro Matsumoto, Tokyo (JP); Hiroshi Nakano, Tokyo (JP); Akira Kotabe, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 424 days.

(21) Appl. No.: 17/594,851

(22) PCT Filed: Apr. 17, 2020

(86) PCT No.: PCT/JP2020/016842
§ 371 (c)(1),
(2) Date: Nov. 1, 2021

(87) PCT Pub. No.: WO2020/230512
PCT Pub. Date: Nov. 19, 2020

(65) Prior Publication Data
US 2022/0214196 A1    Jul. 7, 2022

(30) Foreign Application Priority Data

May 14, 2019    (JP) .................. 2019-091159

(51) Int. Cl.
*G01F 1/688*    (2006.01)
*G01F 1/696*    (2006.01)

(52) U.S. Cl.
CPC ............. *G01F 1/688* (2013.01); *G01F 1/696* (2013.01)

(58) Field of Classification Search
CPC .......... G01F 1/692; G01F 1/696; G01F 1/684; G01F 1/688
See application file for complete search history.

(56) References Cited

U.S. PATENT DOCUMENTS

| | | | |
|---|---|---|---|
| 6,556,929 B1 | 4/2003 | Kleinhans et al. | |
| 11,422,016 B2* | 8/2022 | Matsumoto | ............. G01F 1/692 |
| 2014/0224004 A1 | 8/2014 | Ariyoshi et al. | |
| 2016/0209255 A1 | 7/2016 | Doi et al. | |
| 2017/0343400 A1 | 11/2017 | Morinaga et al. | |

(Continued)

FOREIGN PATENT DOCUMENTS

| | | |
|---|---|---|
| JP | 10-300544 A | 11/1998 |
| JP | 2003-505673 A | 2/2003 |
| JP | 2011-106925 A | 6/2011 |

(Continued)

OTHER PUBLICATIONS

International Search Report (PCT/ISA/210) issued in PCT Application No. PCT/JP2020/016842 dated Jul. 21, 2020 with English translation (seven (7) pages).

(Continued)

*Primary Examiner* — An H Do
(74) *Attorney, Agent, or Firm* — Crowell & Moring LLP (57) ABSTRACT

An air flow rate meter includes a signal detector and a pulse generator. The signal detector is configured to detect that an output signal from the air flow rate detection element has passed a predetermined threshold. The pulse generator generates a pulse signal by using an output signal from the signal detector as a trigger. An output signal from the air flow rate detection element is corrected based on an output of the pulse generator.

10 Claims, 7 Drawing Sheets

(56) References Cited

U.S. PATENT DOCUMENTS

2020/0040834 A1  2/2020  Ito

FOREIGN PATENT DOCUMENTS

| | | |
|---|---|---|
| JP | 2014-153290 A | 8/2014 |
| JP | 2015-49135 A | 3/2015 |
| JP | 2017-211283 A | 11/2017 |
| JP | 2018-179811 A | 11/2018 |

OTHER PUBLICATIONS

Japanese-language Written Opinion (PCT/ISA/237) issued in PCT Application No. PCT/JP2020/016842 dated Jul. 21, 2020 (three (3) pages).

\* cited by examiner

FIG. 16

AIR FLOW RATE METER

TECHNICAL FIELD

The present invention relates to an air flow rate meter that outputs an air flow rate signal based on an output signal from an air flow rate detection element having temperature sensors on the upstream and downstream sides of a heating element and, more particularly, to an air flow rate meter capable of reducing an error (pulsation error) caused by pulsation.

BACKGROUND ART

As an example of an air flow rate meter that reduces a pulsation error, there is a thermal flow rate sensor described in JP 2015-49135 A (PTL 1). The thermal flow rate sensor disclosed in PTL 1 includes an air flow rate detection element including a thin film portion (diaphragm) formed on a semiconductor substrate, a heat generating resistive element disposed on the diaphragm, and an upstream temperature measuring resistive element and a downstream temperature measuring resistive element disposed on the upstream side and the downstream side of the heat generating resistive element and a correction circuit that processes an output signal from the air flow rate detection element based on temperature difference information between the upstream temperature measuring resistive element and the downstream temperature measuring resistive element (abstract and paragraph 0013). When an output signal from the air flow rate detection element exceeds a predetermined value, the correction circuit unit outputs the predetermined value to obtain an output signal waveform with a part of a peak portion or valley portion forming a peak value being cut to the predetermined value (abstract).

CITATION LIST

Patent Literature

PTL 1: JP 2015-49135 A

SUMMARY OF INVENTION

Technical Problem

In short, the maximum value and the minimum value of an output signal from the air flow rate detection element are obtained, and the output signal from the air flow rate detection element is clamped using the clamp value obtained from these values, so that the average value of the output signals from the air flow rate detection element is shifted in the negative direction, and the pulsation error is reduced.

However, the actual pulsation waveform of an engine is a distorted pulsation waveform including harmonics, and a harmonic component of the pulsation waveform changes depending on the type of engine and the load condition of the engine. Therefore, the method of determining the value for clamping an output signal from the air flow rate detection element based on the maximum value and the minimum value of the output signal from the air flow rate detection element as in the above-described conventional technique cannot cope with a distorted pulsation waveform including harmonics. The maximum value and the minimum value of a distorted pulsation waveform including harmonic are different from the maximum value and the minimum value of a pulsation waveform including no harmonic. As a result, it is difficult to set an appropriate clamp value in accordance with a change in harmonic component, and there is a possibility that appropriate correction cannot be performed on an output signal including harmonics. That is, the above-described conventional technique lacks consideration for the actual pulsation waveform of the engine which changes depending on the type of engine and a load condition.

An object of the present invention is to provide an air flow rate meter capable of reducing a pulsation error with respect to a distorted waveform including harmonics.

Solution to Problem

In order to achieve the above object, an air flow rate meter according to the present invention detects that an output signal from a flow rate detection element has passed a predetermined threshold, generates a pulse signal triggered by the detection signal, and corrects the output signal from the flow rate detection element based on the pulse signal.

Advantageous Effects of Invention

According to the present invention, since the pulsation error is corrected by detecting that the output signal from the flow rate detection element has passed the predetermined threshold, it is possible to provide an air flow rate meter with a smaller pulsation error which can perform waveform processing along a physical phenomenon occurring in the flow rate detection element.

Problems, configurations, and effects other than those described above will be clarified by the following description of embodiments.

DESCRIPTION OF EMBODIMENTS

Embodiments of the present invention will be described below reference to the accompanying drawings. Note that the respective embodiments can be combined as long as there is no contradiction. In each embodiment, the same reference numerals denote common components, and a description of them will be omitted. The contents described in the first embodiment are common to other embodiments, and configurations different from those of the first embodiment will be described in other embodiments.

First Embodiment

An air flow rate meter 100A according to the first embodiment of the present invention will be described with reference to FIGS. 1 to 7.

Figure 1:
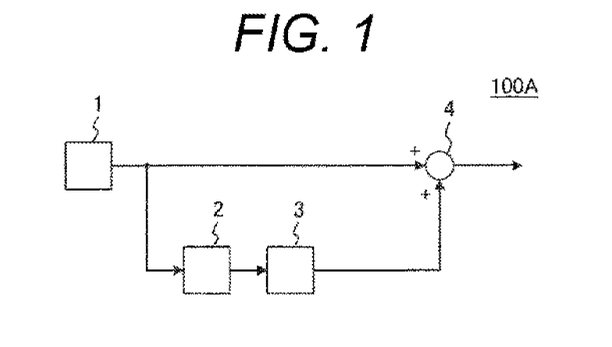
FIG. 1 is a diagram illustrating the configuration of an air flow rate meter 100A according to the first embodiment of the present invention.

FIG. 1 is a diagram illustrating the configuration of an air flow rate meter 100A according to the first embodiment of the present invention.

An air flow rate meter 100A according to the present embodiment includes an air flow rate detection element 1 that generates an output signal corresponding to an air flow rate to be measured, a signal detector 2 that detects that the output signal from the air flow rate detection element 1 has passed a predetermined threshold, a pulse generator 3 that generates a pulse signal using the output signal from the signal detector 2 as a trigger, and an adder 4 that adds the output signal from the pulse generator 3 to the output signal from the air flow rate detection element 1. The air flow rate meter 100A outputs an air flow rate signal based on the output signal from the air flow rate detection element 1.

Note that the adder 4 corresponds to a correction unit that corrects the output signal from the air flow rate detection element 1 based on the output of the pulse generator 3.

Figure 2:
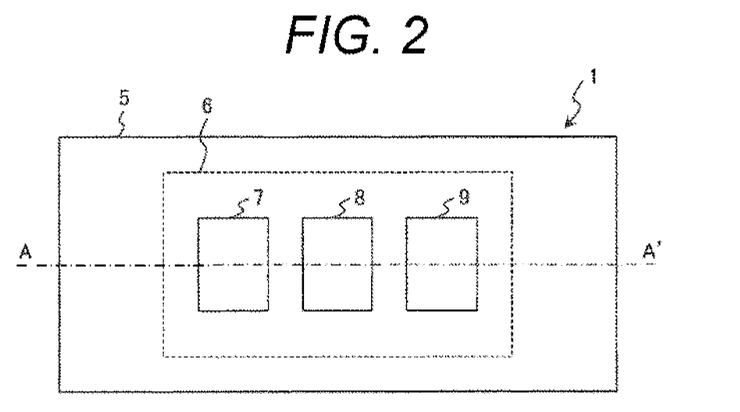
FIG. 2 is a plan view of an air flow rate detection element 1 according to the first embodiment of the present invention.

FIG. 2 is a plan view of the air flow rate detection element 1 according to the first embodiment of the present invention.

Figure 3:
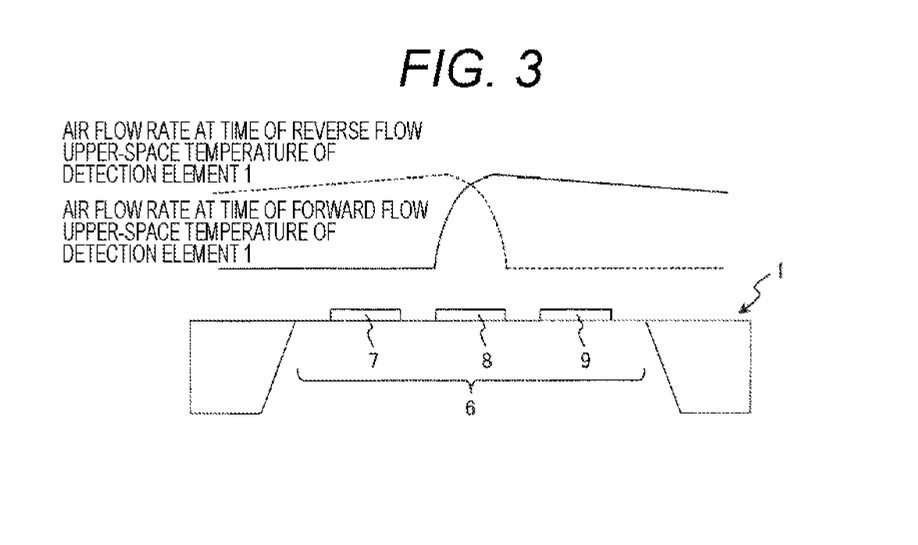
FIG. 3 is a view illustrating a cross section taken along line A-A' in FIG. 2 and the temperature distributions of air flows flowing in a space (upper space) above the flow rate detection element 1.

FIG. 3 is a view illustrating a cross section taken along line A-A' in FIG. 2 and the temperature distributions of air flows flowing in a space above the flow rate detection element 1.

As illustrated in FIGS. 2 and 3, the air flow rate detection element 1 includes a diaphragm 6 formed on a silicon substrate 5 and made of a thermal insulating film. The diaphragm 6 is provided with a heating element 8 heated to a temperature higher than the temperature of a measured air flow, an upstream side temperature sensor 7 arranged on the upstream side of the heating element 8, and a downstream side temperature sensor 9 arranged on the downstream side of the heating element 8. The upstream side temperature sensor 7 and the downstream side temperature sensor 9 each are constituted by a thermosensitive resistor made of a polysilicon thin film or a platinum thin film or a thermocouple made of a polysilicon thin film or a metal thin film. The upstream side temperature sensor 7 measures the temperature on the upstream side of the heating element 8, and the downstream side temperature sensor 9 measures the temperature on the downstream side of the heating element 8. That is, the air flow rate meter 100A heats the heating element 8 to a higher temperature than that of an air flow flowing through a space (to be referred to as an upper space hereinafter) above the air flow rate detection element 1 and measures an air flow rate using the fact that the temperature on the upstream side of the heating element 8 decreases and the temperature on the downstream side increases due to the air flow flowing in the upper space of the air flow rate detection element 1. In order to detect this change in temperature, the upstream side temperature sensor 7 and the downstream side temperature sensor 9 are provided.

The temperature distributions of air flows flowing in the upper space of the air flow rate detection element 1 will be described next with reference to FIG. 3. FIG. 3 is a view illustrating a cross section taken along line A-A' in FIG. 2 and the temperature distributions of air flows flowing in a space (upper space) above the flow rate detection element 1. As for the temperature distributions of air flows, the upper-space temperature at the time of forward flow is indicated by the solid line, and the upper-space temperature at the time of backward flow is indicated by the dotted line.

First, in the case of a forward flow (a state in which an air flow flows from the left side to the right side in FIG. 3), the temperature of the air flow in the upper space of the air flow detection element 1 is maintained at a low temperature until the air flow reaches the heating element 8, but the temperature of the air flow in the upper space of the air flow rate detection element 1 rises to the temperature of the heating element 8 as the air flow passes through the upper space of the heating element 8. After the air flow passes through the upper space of the heating element 8, the temperature gradually decreases due to heat dissipation to the surroundings.

Likewise, in the case of a backward flow (a state in which an air flow flows from the right side to the left side in FIG. 3), the temperature of the air flow in the upper space of the air flow rate detection element 1 is kept at a low temperature until the air flow reaches the heating element 8, but the temperature of the air flow in the upper space of the air flow detection element 1 rises to the temperature of the heating element 8 as the air flow passes through the upper space of the heating element 8 and gradually decreases due to heat dissipation to the surroundings after the air flow passes through the heating element 8. As a result, the temperature in the upper space of the upstream side temperature sensor 7 is low in the case of a forward flow and high in the case of a backward flow. The temperature in the upper space of the downstream side temperature sensor 9 is high in the case of a forward flow and low in the case of a backward flow.

That is, the temperature distribution in the upper space of the air flow rate detection element 1 differs between a forward flow and a backward flow and makes a transition at a change from a forward flow to a backward flow or from a backward flow to a forward flow. In addition, this temperature distribution takes a transition time, which is affected by an air flow rate, the change rate of air flow rate, and the like. For example, when the air flow rate increases in the case of a forward flow, the amount of heat dissipation to the outside increases, and the temperature rise in the upper space of the downstream side temperature sensor 9 is delayed.

The influence of the transition of the temperature distribution on an output signal from the air flow rate detection element 1 will be described next with reference to FIG. 4.

Figure 4:
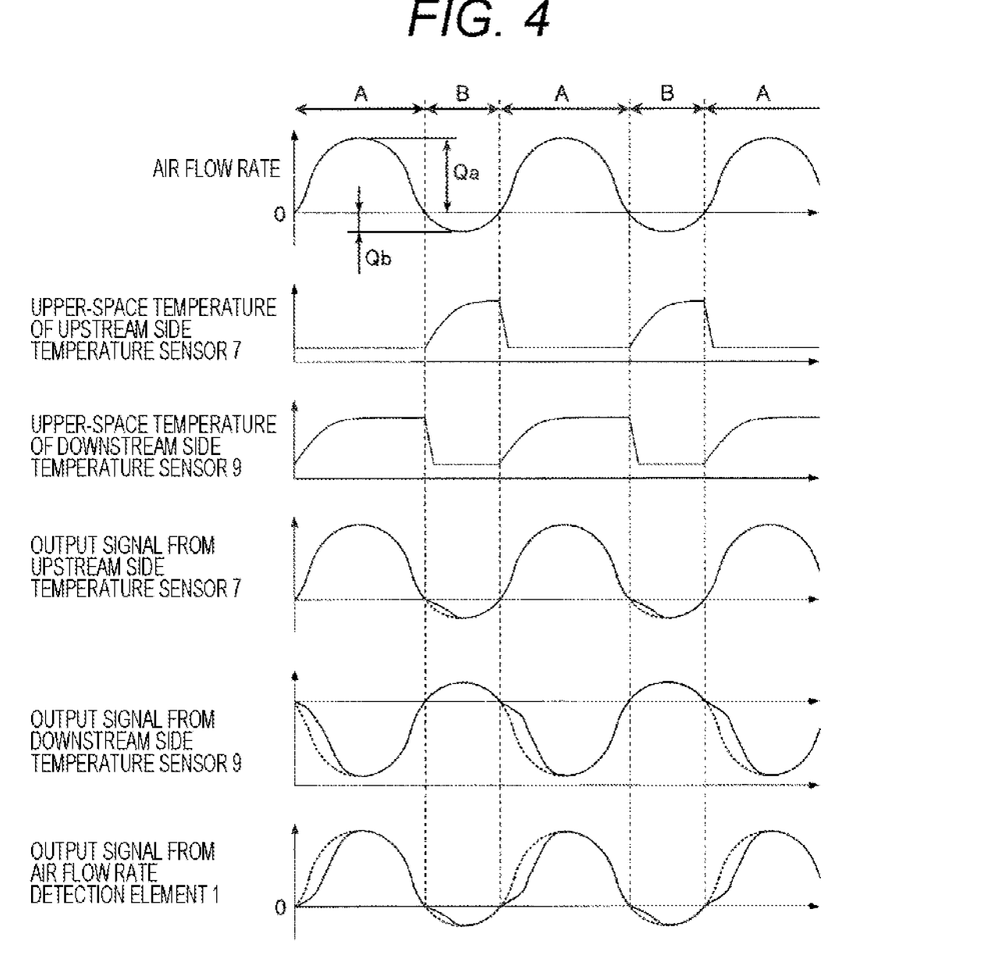
FIG. 4 is a diagram illustrating the waveforms at respective portions of the air flow rate detection element 1.

FIG. 4 is a diagram illustrating the waveforms at respective portions of the air flow rate detection element 1.

When the air flow rate shifts between forward flow state A and backward flow state B as illustrated in FIG. 4, the temperature in the upper space of the upstream side temperature sensor 7 is low during a forward flow and becomes high during a backward flow. In this case, the transition from the high temperature to the low temperature is fast, and the transition from the low temperature to the high temperature is slow. This is because, in a case in which the temperature shifts from the high temperature to the low temperature, the temperature shifts from the high temperature to the low temperature due to the movement of ow-temperature air along the air flow, whereas in a case in which the temperature shifts from the low temperature to the high temperature, it takes time until the movement of air heated by the heating element 8 balances with heat dissipation to the surroundings.

Likewise, the temperature in the upper space of the downstream side temperature sensor 9 is high during a forward flow and becomes low during a backward flow. In this case, the transition from the high temperature to the low temperature is fast, and the transition from the low temperature to the high temperature is slow.

The sensitivity of the upstream side temperature sensor 7 and the downstream side temperature sensor 9 to air flow rates depends on the temperatures of air flows in the upper spaces of the upstream side temperature sensor 7 and the downstream side temperature sensor 9. Accordingly, the sensitivity of the output of the upstream side temperature sensor 7 decreases at the time of transition from a forward flow to a backward flow, and the absolute value of the output becomes smaller than the original output as indicated by the broken line in FIG. 4. This is because it takes time until the upper-space temperature of the upstream side temperature sensor 7 rises, and the sensitivity of the upstream side temperature sensor 7 decreases during this transition time.

Likewise, the sensitivity of the output of the downstream side temperature sensor 9 decreases at the time of transition from a backward flow to a forward flow, and the absolute value of the output becomes smaller than the original output as indicated by the broken line in FIG. 4. This is because it takes time until the temperature in the upper space of the downstream side temperature sensor 9 rises, and the sensitivity of the downstream side temperature sensor 9 decreases during this transition time.

In addition, as illustrated in FIG. 4, when a flow rate Qa on the forward flow side is large and a flow rate Qb on the backward flow side is small, the delay of the upper-space temperature of the downstream side temperature sensor 9 increases. This is because the flow rate when the temperature of the downstream side temperature sensor 9 shifts from a low temperature to a high temperature becomes the flow rate on the forward flow side, the amount of heat dissipation to the outside increases due to the large absolute value of the flow rate, and the increase in the upper-space temperature of the downstream side temperature sensor 9 is delayed. As a result, the error of the downstream side temperature sensor 9 increases, and the average value of the outputs of the air flow rate detection element 1 obtained as the difference between the detection temperature of the upstream side temperature sensor 7 and the detection temperature of the downstream side temperature sensor 9 decreases. That is, in a pulsating state in which a forward flow state and a backward flow state alternately occur, the transition of the temperature distribution of the air flow flowing in the upper space of the air flow rate detection element 1 is delayed at the time of switching from the forward flow to the backward flow or from the backward flow to the forward flow, so that the average value of the outputs of the air flow rate detection element 1 decreases.

Figure 5:
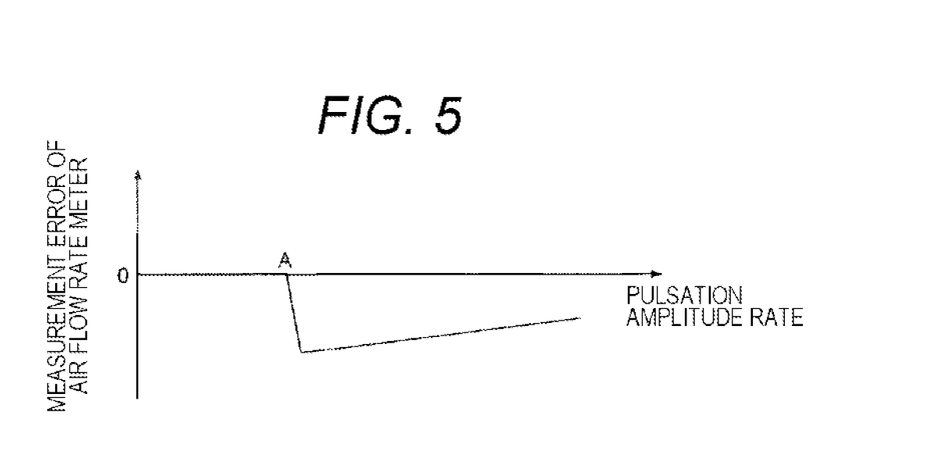
FIG. 5 is a diagram illustrating a measurement error of the air flow rate meter 100A before correction.

As a result, a measurement error as illustrated in FIG. 5 occurs. FIG. 5 is a diagram illustrating a measurement error of the air flow rate meter 100A before correction. The pulsation amplitude factor on the abscissa indicates the ratio between the pulsation amplitude and the average flow rate, and the measurement error of the air flow rate meter on the ordinate indicates the difference between the average value of the true flow rates and the average value of the measurement values of the air flow rate meter.

When the pulsation amplitude factor increases, a backward flow occurs at the pulsation amplitude factor at point A in FIG. 5. At this time, a negative error occurs due to the transition delay of the temperature distribution of the air flow flowing in the upper space of the air flow rate detection element 1.

When the pulsation amplitude factor further increases, the maximum flow rate value on the forward flow side and the maximum flow rate value on the backward flow side increase with respect to the flow rate average value, so that the flow rate waveform on the forward flow side and the flow rate waveform on the backward flow side approach symmetry. As a result, the negative error due to the transition delay of the temperature distribution of the air flow flowing in the upper space of the air flow rate detection element 1 is canceled at the time of switching from the forward flow to the backward flow and at the time of switching from the backward flow to the forward flow, so that the measurement error of the air flow rate meter is reduced. The air flow rate meter 100A according to the present embodiment provides a method of correcting a negative error due to the transition delay of the temperature distribution of an air flow flowing in the upper space of the air flow rate detection element 1.

Figure 6:
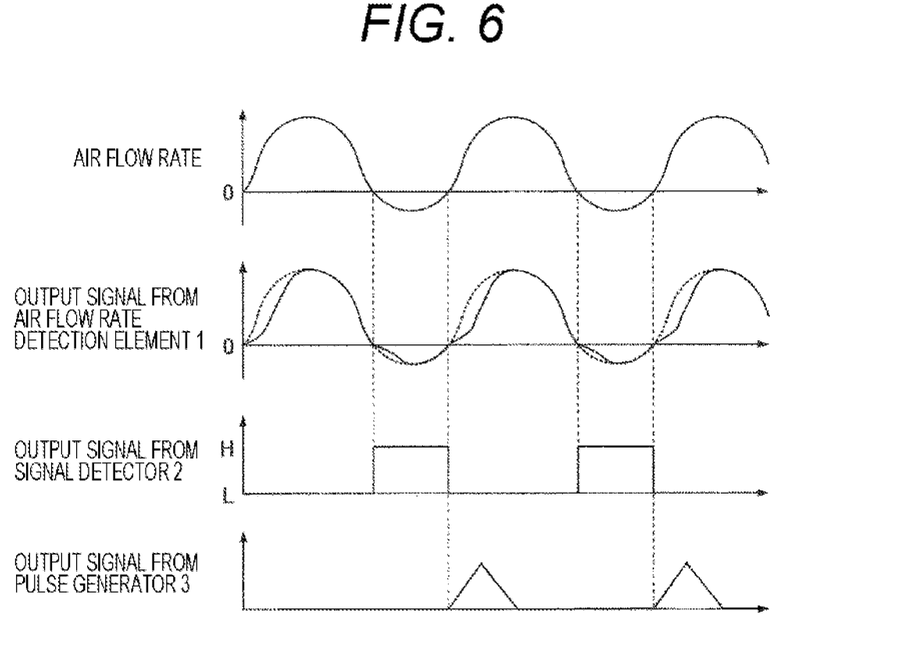
FIG. 6 is a diagram illustrating waveforms at respective portions of the air flow rate meter 100A.

The operation of the air flow rate meter according to the present embodiment will be described next with reference to FIG. 6. FIG. 6 is a diagram illustrating waveforms at respective portions of the air flow rate meter 100A. Referring to FIG. 6, it is assumed that the air flow rate shifts between the forward flow state and the backward flow state as in FIG. 4, and the output of the air flow rate detection element 1 at this time is illustrated.

The broken line illustrated in the graph of the output of the air flow rate detection element 1 is the output of the air flow rate detection element 1 in a case in which there is no error due to the transition delay of the temperature distribution of the air flow flowing in the upper space of the air flow rate detection element 1.

When the output of the air flow rate detection element 1 changes as illustrated in FIG. 6, the signal detector 2 detects that the output of the air flow rate detection element 1 has passed a predetermined threshold (0 in the present embodiment) and outputs an output signal as illustrated in FIG. 6. In the present embodiment, the threshold is set to 0 V, and the signal detector 2 outputs a rectangular wave switching between H (high) and L (low) at the threshold. In the present embodiment, the signal detector 2 is configured such that the output signal rises from L to H when switching from the forward flow to the backward flow, and the output signal falls from H to L when switching from the backward flow to the forward flow.

The pulse generator 3 outputs one pulse of the triangular waveform illustrated in FIG. 6 with the falling edge of the signal detection 2 as a trigger. This pulse signal is added to the output signal from the air flow rate detection element 1 by the adder 4 and output as an output signal from the air flow rate meter. That is, in the air flow rate meter 100A according to the present embodiment, the signal detector 2 detects that the air flow rate changes from the backward flow to the forward flow, and the pulse signal generated by the pulse generator 3 is added to the output signal from the air flow rate detection element 1 at the timing when the backward flow changes to the forward flow, thereby correcting the negative error due to the transition delay of the temperature distribution of the air flow flowing in the upper space of the air flow rate detection element 1.

Figure 7:
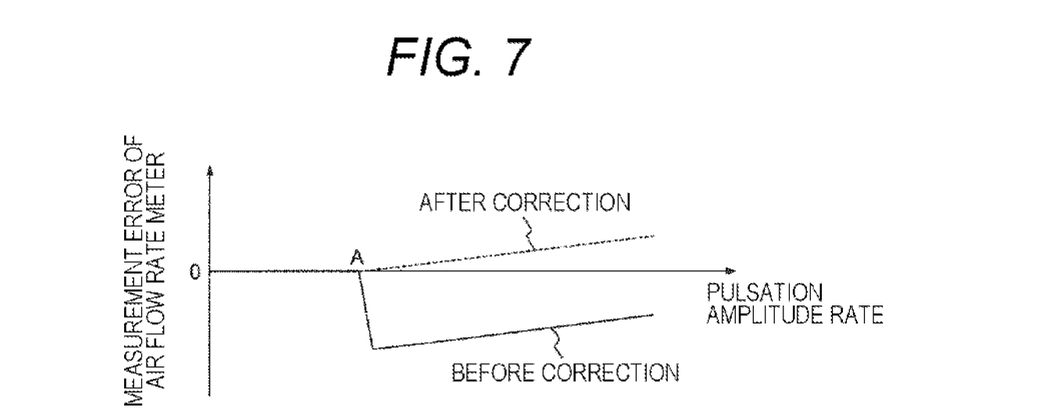
FIG. 7 is a diagram illustrating a measurement error of the air flow rate meter 100A after correction.

FIG. 7 is a diagram illustrating a measurement error of the air flow rate meter 100A after correction. Correcting the above-described negative error can correct the measurement error (before correction in FIG. 7) illustrated in FIG. 5 to the measurement error (after correction in FIG. 7) illustrated in FIG. 7.

Note that, although the adder 4 is used in the present embodiment, a multiplier or a divider can be used instead of the adder 4, and the output signal from the pulse generator 3 can be replaced with a signal corresponding to these computations.

In addition, the output signal from the pulse generator 3 has a triangular waveform in the present embodiment, but may have a square wave or a waveform like a first-order delay. In short, an output signal from the pulse generator 3 may have a waveform that corrects the difference between the broken line (actual flow rate value) and the solid line (measurement value including negative error) of an output signal from the air flow rate detection element 1 in FIG. 6 to make the solid line approach the broken line.

The air flow rate meter 100A according to the present embodiment performs correction in accordance with a physical phenomenon occurring in the air flow rate detection element 1 and hence can cope with any air flow. That is, it is possible to cope with a distorted waveform including harmonics like the pulsation waveform of an actual engine.

Second Embodiment

Figure 8:
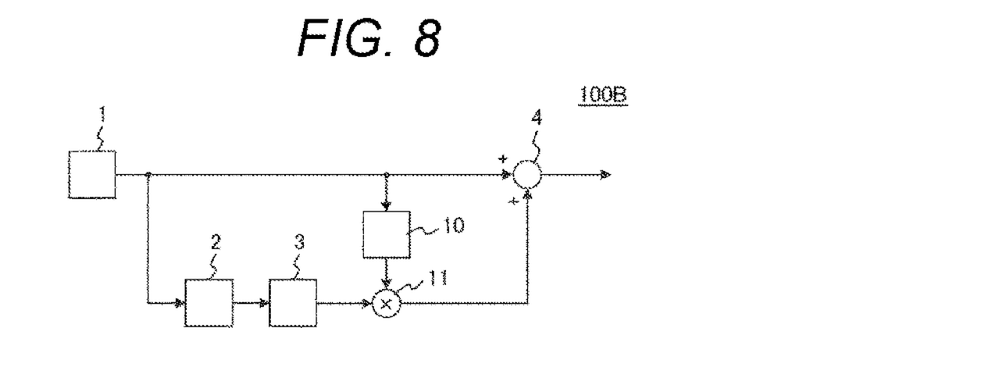
FIG. 8 is a diagram illustrating the configuration of an air flow rate meter 100B according to the second embodiment of the present invention.
Figure 9:
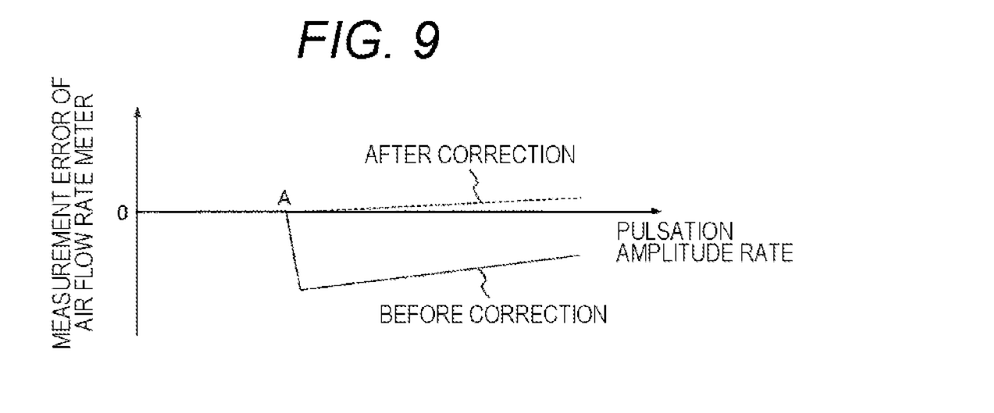
FIG. 9 is a diagram illustrating measurement errors of the air flow rate meter 100B before and after correction.

An air flow rate meter 100B according to the second embodiment of the present invention will be described next with reference to FIGS. 8 and 9. FIG. 8 is a diagram illustrating the configuration of the air flow rate meter 100B according to the second embodiment of the present invention. FIG. 9 is a diagram illustrating measurement errors of the air flow rate meter 100B before and after correction.

The air flow rate meter 100B according to the present embodiment is basically the same as the air flow rate meter 100A according to the first embodiment, but additionally includes a conversion map 10 for converting an output signal from an air flow rate detection element 1 by a predetermined function and a multiplier 11 for multiplying an output signal from the pulse generator 3 by the output of the conversion map 10. In the present embodiment, the conversion map 10 and the multiplier 11 constitute a correction unit that corrects an output signal from the pulse generator 3 based on an output signal from the air flow rate detection element 1.

As described in the first embodiment, the transition delay of the temperature distribution of the air flow flowing in the upper space of the air flow rate detection element 1 depends on the state of the air flow rate at that time. Since the state of an air flow rate is generally considered as an output signal from the air flow rate detection element 1, the output signal from the air flow rate detection element 1 is converted via the conversion map 10 to change the magnitude of an output signal from the pulse generator 3 by the multiplier 11. This makes it possible to more accurately correct an error due to a transition delay of the temperature distribution of an air flow flowing in the upper space of the air flow rate detection element 1. As a result, as illustrated in FIG. 9, it is possible to reduce the measurement error with pulsation amplitude factors in a wider range.

Third Embodiment

An air flow rate meter 100C according to the third embodiment of the present invention will be described next with reference to FIG. 10.

Figure 10:
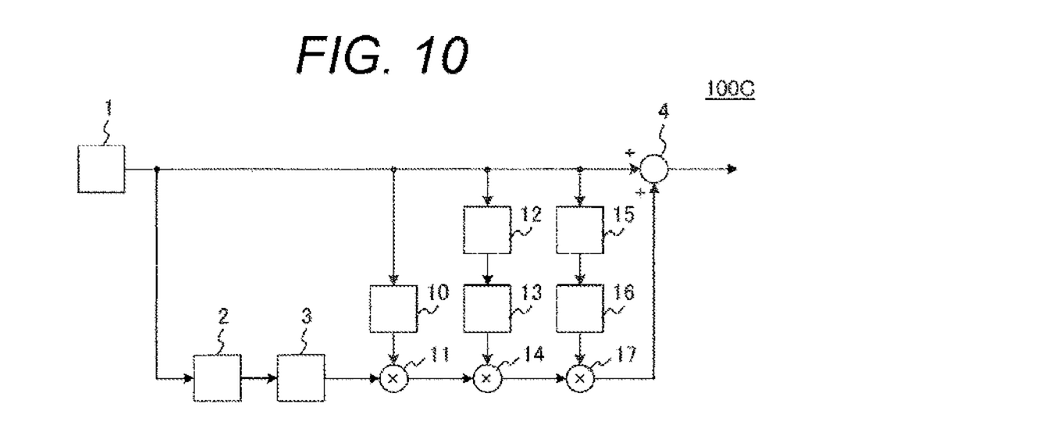
FIG. 10 is a diagram illustrating the configuration of an air flow rate meter 100C according to the third embodiment of the present invention.

FIG. 10 is a diagram illustrating the configuration of the air flow rate meter 100C according to the third embodiment of the present invention.

The air flow rate meter 100C according to the present embodiment is basically the same as the air flow rate meter 100B according to the second embodiment. However, in addition to the components of the air flow rate meter 100B according to the second embodiment, the air flow rate meter 100C includes a differentiator 12 that differentiates an output signal from an air flow rate detection element 1, a conversion map (conversion unit) 13 that converts an output signal from the differentiator 12 by a predetermined function, a multiplier 14 that multiplies an output signal from a multiplier 11 by the output of the conversion map 13, a representative value detection unit 15 that extracts a representative value from an output signal from the air flow rate detection element 1, a conversion map (conversion unit) 16 that converts an output signal from the representative value detection unit 15 by a predetermined function, and a multiplier 17 that multiplies an output signal from the multiplier 14 by the output of the conversion map 16. The representative value detection unit 15 extracts an average value, a frequency, a maximum value, a minimum value, and the like from an output signal from the air flow rate detection element 1.

In the present embodiment, the pulse signal generated by the pulse generator 3 is corrected using the representative value, that is, any one of the average value, the frequency, the maximum value, and the minimum value of the output signal from the air flow rate detection element. As a representative value for correcting a pulse signal, a plurality of representative values from among an average value, a frequency, a maximum value, and a minimum value may be used. That is, in the present embodiment, the pulse signal generated by the pulse generator 3 is corrected using at least any one of the average value, the frequency, the maximum value, and the minimum value of the output signal from the air flow rate detection element.

The error due to the transition delay of the temperature distribution of an air flow flowing in the upper space of the air flow rate detection element 1 depends on the state of the air flow rate at that time. Accordingly, in the present embodiment, the correction amount can be adjusted using the differential value of the output signal from the air flow rate detection element 1 and the representative value of the output signal from the air flow rate detection element 1. This makes it possible to more accurately correct an error due to a transition delay of the temperature distribution of an air flow flowing in the upper space of the air flow rate detection element 1. Adjusting the pulse width of the pulse signal generated by the pulse generator 3 with an output signal from the differentiator 12 and an output signal from the representative value detection unit 15 makes it possible to more accurately correct an error due to the transition delay of the temperature distribution of an air flow flowing in the upper space of the flow rate detection element 1.

Note that the pulse width of the pulse signal generated by the pulse generator 3 can be adjusted with any one of an output signal from the differentiator 12 and an output signal from the representative value detection unit 15, and this makes it possible to correct an error due to the transition delay of the temperature distribution of an air flow flowing in the upper space of the flow rate detection element 1 more accurately than the air flow rate meter 100B according to the second embodiment.

As described above, in the present embodiment, an output signal from the pulse generator 3 is corrected based on at least one of the representative value of an output signal from the air flow rate detection element 1 and the differential value of the output signal from the air flow rate detection element 1. The differentiator 12, the conversion map 13, the multiplier 14, the representative value detection unit 15, the conversion map 16, and the multiplier 17 constitute a correction unit that corrects an output signal from the pulse generator 3.

The configuration different from that of the second embodiment added in the present embodiment can be applied to the air flow rate meter 100A according to the first embodiment. In this case, the third embodiment may be configured to have at least one of the following correction units: a correction unit constituted by the conversion map 10 and the multiplier 11, a correction unit constituted by the differentiator 12, the conversion map 13, and the multiplier 14, and a correction unit constituted by the representative value detection unit 15, the conversion map 16, and the multiplier 17.

Fourth Embodiment

An air flow rate meter 100D according to the fourth embodiment of the present invention will be described with reference to FIG. 11.

Figure 11:
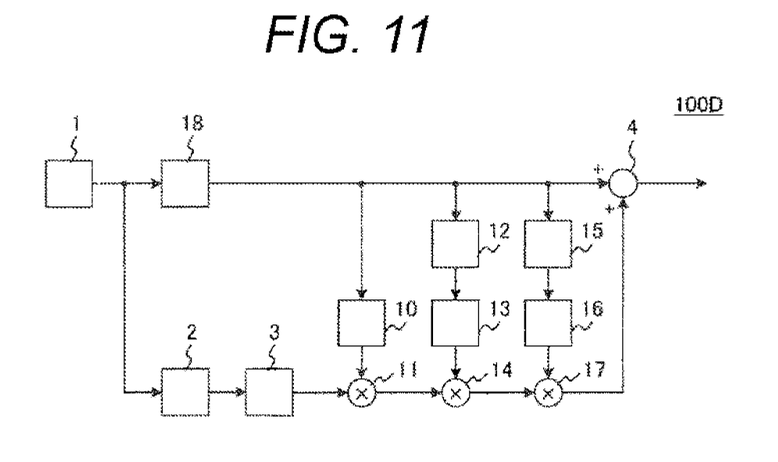
FIG. 11 is a diagram illustrating the configuration of an air flow rate meter 100D according to the fourth embodiment of the present invention.

FIG. 11 is a diagram illustrating the configuration of the air flow rate meter 100D according to the fourth embodiment of the present invention.

The air flow rate meter 100D according to the present embodiment is basically the same as the air flow rate meter 100C according to the third embodiment. However, the air flow rate meter 100D additionally includes a conversion map (linearization unit) 18 for linearizing an output signal from an air flow rate detection element 1 to a flow rate conversion value. This makes it possible to easily obtain the representative value converted from an output signal from the air flow rate detection element 1 into an air flow rate. The differential value converted from an output signal from the air flow rate detection element 1 into an air flow rate can also be easily obtained. In general, since the output of the thermal air flow rate detection element 1 is a function of the second to fourth root of the air flow rate and is nonlinear, an output signal from the air flow rate detection element 1 is converted into an air flow rate.

The configuration different from that of the third embodiment added in the present embodiment can be applied to the air flow rate meters 100A and 100B according to the first and second embodiments.

Fifth Embodiment

Figure 12:
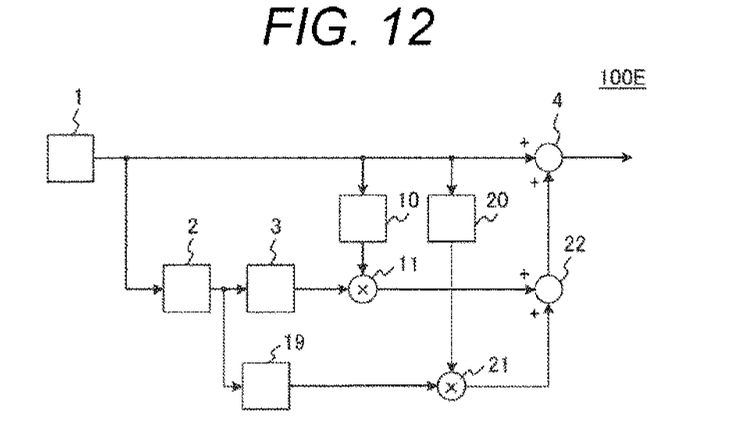
FIG. 12 is a diagram illustrating the configuration of an air flow rate meter 100E according to the fifth embodiment of the present invention.
Figure 13:
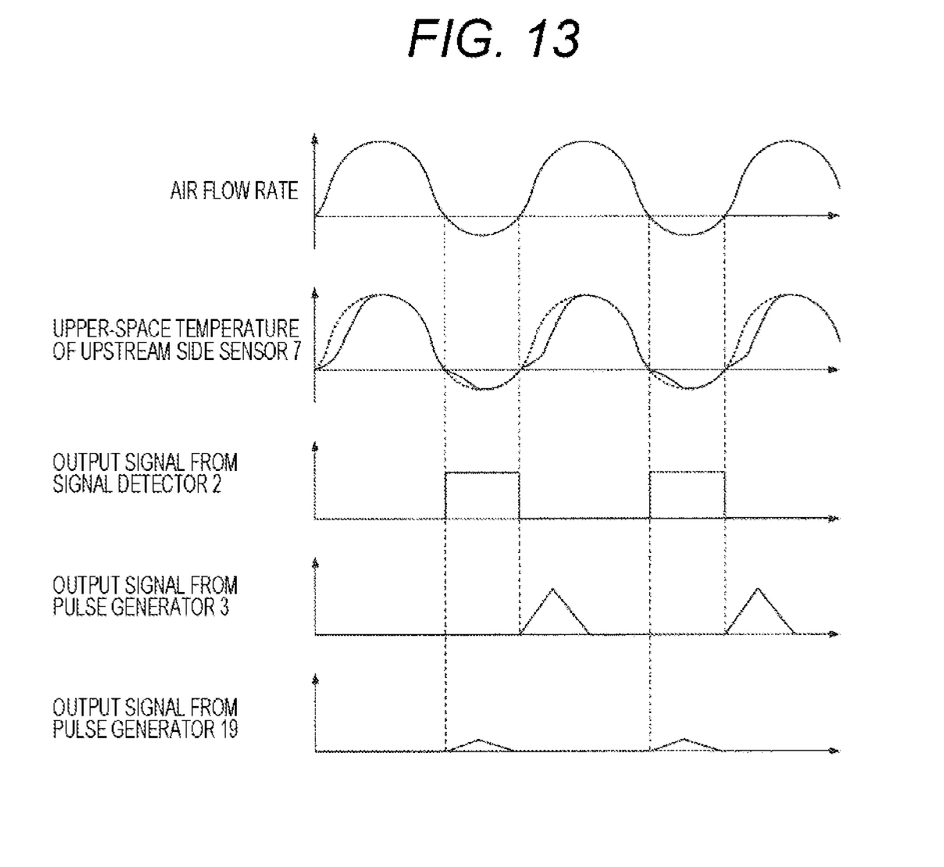
FIG. 13 is a diagram illustrating waveforms at respective portions of the air flow rate meter 100E.

An air flow rate meter 100E according to the fifth embodiment of the present invention will be described with reference to FIGS. 12 and 13. FIG. 12 is a diagram illustrating the configuration of the air flow rate meter 100E according to the fifth embodiment of the present invention. FIG. 13 is a diagram illustrating waveforms at respective portions of the air flow rate meter 100E.

The air flow rate meter 100E of the present embodiment is basically the same as the air flow rate meter 100B of the second embodiment. However, the air flow rate meter 100E additionally includes a pulse generator 19 that outputs one pulse of a triangular waveform using a rising edge of an output signal from a signal detector 2 as a trigger, a conversion map 20 that converts an output signal from the air flow rate detection element 1 by a predetermined function in order to change the magnitude of the output of the pulse generator 19 according to an output signal from the air flow rate detection element 1, a multiplier 21 that multiplies an output signal from the pulse generator 19 by the output of the conversion map 20, and an adder 22 that adds the output of a multiplier 11 and the output of the multiplier 21. This makes it possible to correct not only an error due to the transition delay of the temperature distribution of an air flow flowing in the upper space of the air flow rate detection element 1 which is caused when the air flow rate changes from a backward flow to a forward flow but also an error due to the transition delay of the temperature distribution of an air flow flowing in the upper space of the air flow rate detection element 1 which is caused when the air flow rate changes from a forward flow to a backward flow. As a result, it is possible to correct an error due to the transition delay of the temperature distribution of an air flow flowing in the upper space of the air flow rate detection element 1 with higher accuracy.

The configuration different from that of the second embodiment added in the present embodiment can be applied to the air flow rate meter 100A according to the first, third, and fourth embodiments. Note that, although the effect of correction is greater when an error due to the transition delay caused at the time of change from a backward flow to a forward flow is corrected, the effect of correction can be obtained by correcting only the error due to the transition delay caused at the time of change from a forward flow to a backward flow.

That is, the fifth embodiment may include, as a pulse generator, at least the leading edge detection pulse generator 19 that generates a pulse signal using a leading edge of an output signal from the signal detector 2 as a trigger or a trailing edge detection pulse generator 3 that generates a pulse signal using a trailing edge of an output signal from the signal detector 2 as a trigger.

Sixth Embodiment

Figure 14:
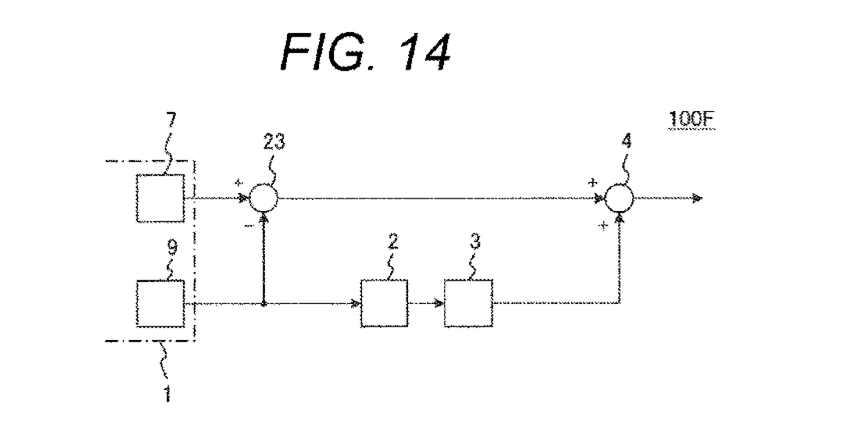
FIG. 14 is a diagram illustrating the configuration of an air flow rate meter 100F according to the sixth embodiment of the present invention.
Figure 15:
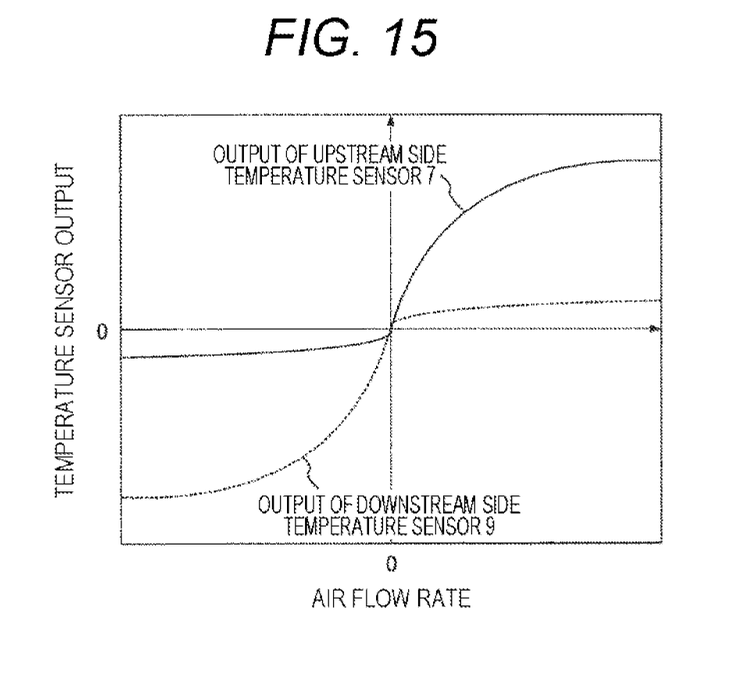
FIG. 15 is a graph illustrating output characteristics of an upstream side temperature sensor 7 and a downstream side temperature sensor 9 with respect to air flow rates.
Figure 16:
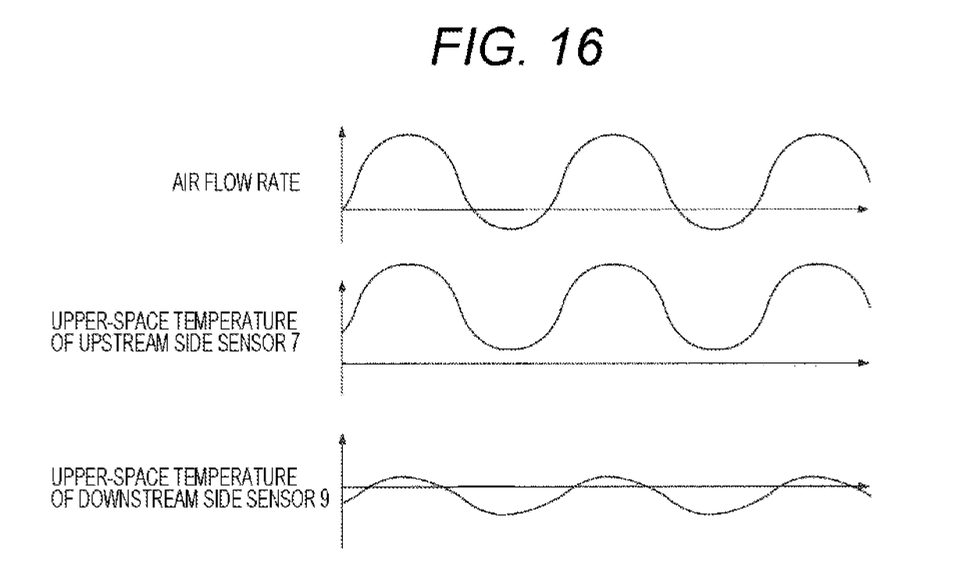
FIG. 16 is a diagram illustrating output waveforms of the upstream side temperature sensor 7 and the downstream side temperature sensor 9 during pulsation.

An air flow rate meter 100F according to the sixth embodiment of the present invention will be described with reference to FIGS. 14 to 16. FIG. 14 is a diagram illustrating the configuration of the air flow rate meter 100F according to the sixth embodiment of the present invention. FIG. 15 is a graph illustrating output characteristics of the upstream side temperature sensor 7 and the downstream side temperature sensor with respect to air flow rates. FIG. 16 is a diagram illustrating output waveforms of the upstream side temperature sensor 7 and the downstream side temperature sensor 9 during pulsation.

The air flow rate meter 100F according to the present embodiment is basically the same as the air flow rate meter 100A according to the first embodiment, but is different from the air flow rate meter 100A according to the first embodiment in a configuration in which the output of the upstream side temperature sensor 7 and the output of the downstream side temperature sensor 9 are individually extracted, and the difference between the output of the upstream side temperature sensor 7 and the output of the downstream side temperature sensor 9 is calculated by a subtractor 23. Furthermore, the configuration in which the input of the signal detector 2 is used as an output signal from the downstream side temperature sensor 9 is also different from that of the air flow rate meter 100A according to the first embodiment.

The output of the thermal air flow rate meter with respect to an air flow rate has a non-linear characteristic as illustrated in FIG. 15 and has asymmetric characteristics on the forward flow side and the backward flow side in many cases, and the output of the upstream side temperature sensor 7 has a high sensitivity of the output signal on the forward flow side and a low sensitivity of the output signal on the backward flow side. In the output of the downstream side temperature sensor 9, the sensitivity of the output signal on the forward flow side is low, and the sensitivity of the output signal on the backward flow side is high. As illustrated in FIG. 16, the output signals from the upstream side temperature sensor 7 and the downstream side temperature sensor 9 having such characteristics at the time of pulsation indicate that the average value of the output signals from the upstream side temperature sensor 7 shifts to the positive side due to asymmetric output characteristics and the response delay of the upstream side temperature sensor 7. As a result, although the air flow rate changes from the forward flow to the backward flow, the output of the upstream side temperature sensor 7 does not reach a value indicating the backward flow, and the occurrence of the backward flow cannot be detected. This occurs when the amplitude of the differential signal between the upstream side temperature sensor 7 and the downstream side temperature sensor 9 decreases due to a response delay. As a result, it is not possible to detect the transition from the forward flow to the backward flow or from the backward flow to the forward flow, and it is not possible to correct an error due to the transition delay of the temperature distribution of the air flow flowing in the upper space of the air flow rate detection element 1.

In order to solve this problem, in the present embodiment, an output signal from the downstream side temperature sensor 9 is input to a signal detector 2. As illustrated in FIG. 15, the output of the downstream side temperature sensor 9 is large in the case of the backward flow and is small in the case of the forward flow. For this reason, as illustrated in FIG. 16, since the signal greatly swings to the backward flow side, it is possible to easily detect the backward flow. This makes it possible to easily detect the transition from the forward flow to the backward flow or from the backward flow to the forward flow, and hence it is possible to easily correct an error due to the transition delay of the temperature distribution of the air flow flowing in the upper space of an air flow rate detection element 1. This provides a large effect at a high pulsation frequency at which the response delays of the upstream side temperature sensor 7 and the downstream side temperature sensor 9 appear significantly.

As described above, the air flow rate meter according to the above-described embodiment of the present invention sets the threshold used for determination by the signal detector 2 to a value for detecting a time point at which the forward flow of air changes to the backward flow or a time point at which the backward flow of air changes to the forward flow and corrects an error due to the transition delay of the temperature distribution of the air flow flowing in the upper space of the air flow rate detection element 1 based on the pulse signal generated by the pulse generator 3.

In addition, the present invention is not limited to each embodiment and includes various modifications. For example, the above embodiments have been described in detail for easy understanding of the present invention, and is not necessarily limited to one having all the configurations. Further, part of the configuration of one embodiment can be replaced with the configuration of another embodiment, and the configuration of another embodiment can be added to the configuration of one embodiment. Moreover, it is possible to add, remove, and replace other configurations with respect to part of the configurations of each embodiment.

REFERENCE SIGNS LIST 1 air flow rate detection element
2 signal detector
3 pulse generator
4 adder
5 silicon substrate
6 diaphragm
7 upstream side temperature sensor
8 heating element
9 downstream side temperature sensor
10 conversion map
11 multiplier
12 differentiator
13 conversion map
14 multiplier
15 representative value detection unit
16 conversion map
17 multiplier
18 conversion map
19 pulse generator
20 conversion map
21 multiplier
22 adder
23 subtractor
100A to 100F air flow rate meter

The invention claimed is:

1. An air flow rate meter that includes an air flow rate detection element including an upstream side temperature sensor arranged on an upstream side of a heating element and a downstream side temperature sensor arranged on a downstream side of the heating element and outputs an air flow rate signal based on an output signal from the air flow rate detection element, the air flow rate meter comprising:
   a signal detector configured to detect that an output signal from the air flow rate detection element has passed a predetermined threshold; and
   a pulse generator that generates a pulse signal by using an output signal from the signal detector as a trigger,
   wherein an output signal from the air flow rate detection element is corrected based on an output of the pulse generator.

2. The air flow rate meter according to claim 1, wherein an output signal from the pulse generator is corrected based on an output signal from the air flow rate detection element.

3. The air flow rate meter according to claim 1, further comprising a differentiator configured to differentiate an output signal from the air flow rate detection element,
   wherein an output signal from the pulse generator is corrected based on a differential value of an output signal from the air flow rate detection element.

4. The air flow rate meter according to claim 1, further comprising a representative value detection unit configured to extract a representative value from an output signal from the air flow rate detection element, wherein an output signal from the pulse generator is corrected based on the representative value.

5. The air flow rate meter according to claim 4, wherein the representative value is at least one of an average value, a frequency, a maximum value, and a minimum value of an output signal from the air flow rate detection element.

6. The air flow rate meter according to claim 4, further comprising a linearization unit configured to linearize an output signal from the air flow rate detection element to a flow rate conversion value,
wherein the representative value is extracted from the signal linearized by the linearization unit.

7. The air flow rate meter according to claim 4, further comprising a conversion unit configured to convert a representative value of an output signal from the air flow rate detection element by a predetermined function.

8. The air flow rate meter according to claim 1, further comprising, as the pulse generator, at least one of a leading edge detection pulse generator configured to generate a pulse signal using a leading edge of an output signal from the signal detector as a trigger and a trailing edge detection pulse generator configured to generate a pulse signal using a trailing edge of an output signal from the signal detector as a trigger.

9. The air flow rate meter according to claim 1, wherein the air flow rate detection element causes an upstream side temperature sensor and a downstream side temperature sensor to output output signals, and the signal detector detects that an output signal from the downstream side temperature sensor has passed a predetermined threshold.

10. The air flow rate meter according to claim 1, wherein the threshold is set to a value for detecting a time point at which a forward flow of air changes to a backward flow or a time point at which a backward flow of air changes to a forward flow, and an error due to a transition delay of a temperature distribution of an air flow flowing in an upper space of the air flow rate detection element is corrected based on the pulse signal generated by the pulse generator.

* * * * *